Feb. 10, 1959 — R. H. ROEDER — 2,873,105
GOVERNOR
Filed Aug. 28, 1956 — 2 Sheets-Sheet 1

ROLF H. ROEDER
INVENTOR.
BY Daniel H. Bobis
atty

Feb. 10, 1959 R. H. ROEDER 2,873,105
GOVERNOR
Filed Aug. 28, 1956 2 Sheets-Sheet 2

ROLF H. ROEDER
INVENTOR.

BY Daniel H. Bobis
Atty

United States Patent Office
2,873,105
Patented Feb. 10, 1959

2,873,105
GOVERNOR

Rolf H. Roeder, Wuerzburg, Germany, assignor to Worthington Corporation, Harrison, N. J., a corporation of Delaware Application August 28, 1956, Serial No. 606,742

4 Claims. (Cl. 264—19)

The present invention relates generally to governors and more particularly to a variable speed governor, the control action of which is derived from the pressure of a rotating mass of fluid.

In the copending application, Serial No. 606,713, filed August 28, 1956, a hydraulic mechanical governor is disclosed wherein once the operating speed of the governor is set it is necessary to stop the device or the governor to modify or adjust the governor to operate at a new speed setting.

The present invention overcomes this problem by providing a hydraulic mechanical governor wherein within the fluid capacity of the governor the speed at which the governor operates may be varied to an infinite number of settings without stopping or interfering with the operation of the governor or the device on which it is mounted.

In accordance with the present invention, a hydraulic mechanical governor is provided comprising a vessel fixedly connected to and rotatable with the shaft of the device to be governed and a slidable piston member mounted in said vessel to form a liquid compartment for containing actuating fluid, the fluid to be rotated by intermeshing vanes on said vessel and piston respectively so that the fluid will cause the piston member to reposition itself and in turn actuate a control rod connected thereto and to the mechanism which controls the speed of the device to be governed and hence the speed of the shaft, tension means being provided to normally urge the slidable piston member in a direction opposite but proportional to any decrease in force exerted by said actuating fluid on said piston member during operation and means being provided in said fluid compartment to provide communication between said compartment and a source of actuating fluid, which means is radially adjustable therein from a point externally of the governor for controlling the amount of fluid in said compartment to secure the desired speed setting.

The present invention provides a shaft governor actuated by pressure of a rotating mass of fluid therein which requires little energy, needs no cooling, and the control action is not affected by viscosity changes.

The present invention further provides a variable speed governor which produces an instantaneous control action of the shaft to which it is attached and eliminates any hunting of the governor.

The invention will be better understood from the following description when considered in connection with the accompanying drawings forming a part thereof, and in which Figure 1 is a longitudinal section of the governor embodied in the present invention.

Figures 1, 2:
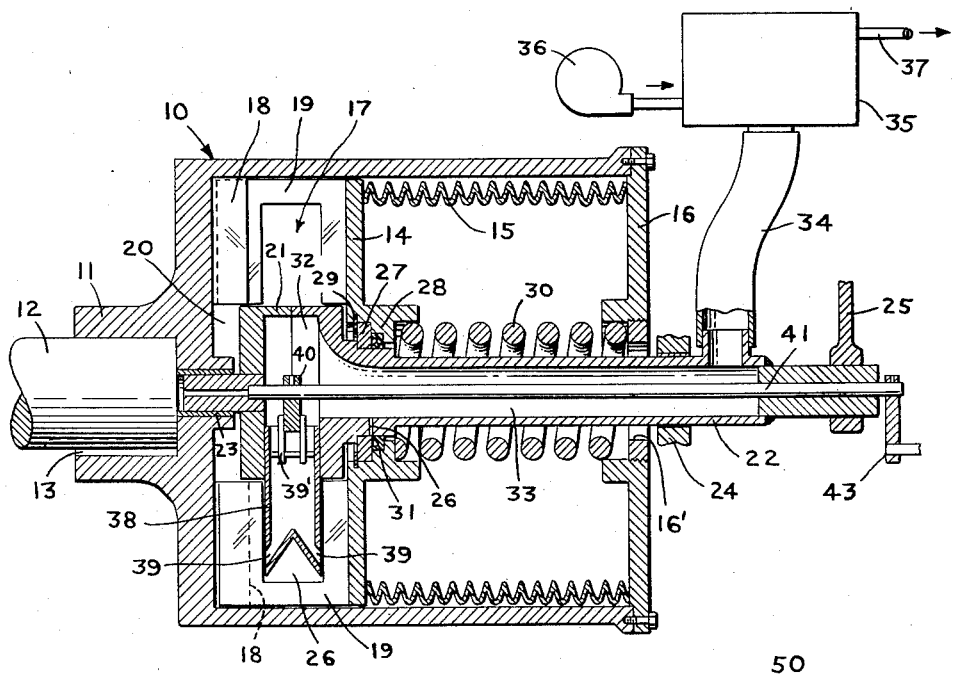
Figure 2 is a view similar to Figure 1 showing a modified form of the governor of the present invention.

Referring to Figure 1, the reference numeral 10 designates a substantially cylindrical governor vessel provided with a hub portion 11, fixed on a shaft 12 by a key 13 for rotation with the shaft. A diaphragm or piston member 14 is slidably mounted in said vessel by means of bellows 15 connected at one end to the outer edge of the diaphragm and at the other end to a backup or cover element 16 provided at the end of the vessel 10 remote from the shaft connected end. The piston member 14 delineating a liquid compartment generally designated 17 in the vessel 10 for receiving actuating fluid as hereinafter described.

The vessel 10 is further provided at the shaft attached end with a plurality of vanes 18 which vanes radiate from points spaced from the axial center of the vessel to the inner periphery thereof and are circumferentially disposed about the axial center of the vessel in spaced relation to each other. The vanes 18 extend axially into the liquid compartment 17 where they intermesh and overlap the adjacent legs of a plurality of similarly disposed radially extending U-shaped vane members 19 mounted by their respective legs remote from vanes 18 to the face of the diaphragm member 14 delineating the liquid compartment 17.

This arrangement of vanes defines a circumferential portion 20 in the liquid compartment 17 about the axial center of the vessel in which is disposed a container or cylindrical vessel 21 formed integrally with a nonrotatable control rod 22 mounted between a bearing 23 in the hub portion 11 of the vessel 10 and to a sleeve bearing 24 outwardly of the vessel 10, the control rod 22 thus being disposed to extend axially outward from the compartment 17 through the diaphragm 14 and an opening 16' provided in the backup or cover plate 16 for the vessel 10. The control rod 22 connects through a suitable lever 25 to the mechanism, not shown, which controls the speed of the device to be governed.

The vanes also form an annular portion 26 in the liquid compartment concentric to the circumferential portion 20, the purpose of which will appear clear hereinafter.

Figure 1 further shows the control rod 22 provided with a thrust collar 27 which is adapted to engage a shoulder 28 provided on the diaphragm 14 and a snap ring 29 so that the control rod will be moved axially when the diaphragm 14 is actuated by the fluid in the liquid compartment as hereinafter described. A spring member 30 mounted about the control rod 22 is disposed so that opposite ends thereof abut the backup plate 16 and the diaphragm member 14 to normally urge the diaphragm member 14 towards the shaft end of the vessel 10 and the spring member will at all times urge the diaphragm member 14 in a direction opposite to but proportional to the reduction in force exerted by the actuating fluid in the compartment 17 during the operation of the governor.

A sealing means 31 is provided to engage the thrust collar 27 to prevent fluid from entering the bellows member 15 when the governor is not in operation.

The cylindrical vessel or container 21 has a fluid supply chamber 32 formed therein which communicates through a passage 33 formed in the control rod 22 in turn communicating through connecting line 34 with a constant level reservoir 35 for actuating fluid which passages are in open communication at all times to allow fluid to flow to and from the reservoir and the supply chamber as is required during the operation of the governor. A pump 36 having its discharge connected to the lower end of the tank 35 and an overflow pipe 37 act to maintain the level of the fluid in the reservoir constant.

The cylindrical vessel 21 has a radially slidable nozzle element 38 disposed therein which is elongated so that it can extend substantially the full depth of the annular portion 26 formed by the U-shaped vanes 19 in the liquid compartment 17. The radially slidable nozzle has ports 39 adjacent the outer end thereof to establish communication between the annular portion 26 formed in the liquid compartment 17 and the fluid supply chamber 32 in the cylindrical vessel 21 to allow fluid to flow to and from said liquid compartment and fluid supply chamber as required during operation of the governor.

The radially slidable nozzle is pivotally connected through a support 39' to an eccentric 40 fixed to and moved by an adjusting shaft 41 which extends axially through the passage 33 in the control rod 22 and outwardly of the end of the control rod where it is connected to a handle or crank member 43. Rotation of the crank will move the eccentric 41 which in turn displaces the nozzle element radially inward and outward of the container or cylinder 21 so that the ports 39 may be positioned radially at an infinite number of points in the annular portion 26 formed by the vanes 19 in the liquid compartment 17.

Operation

If the reservoir 35 has actuating fluid therein then the liquid compartment 17, the nozzle 38, the fluid supply chamber 32, passage 33, and connecting line 34 will be filled with actuating fluid by reason of the free communication of these chambers and passages.

Whether the device to be governed is in operation or not and hence whether the governor is being rotated by the shaft or not, the nozzle element 38 may be positioned to any predetermined radial distance into the annular portion 26 of the liquid compartment by rotating the crank 43 as above described.

The position of the nozzle will determine the quantity of fluid that will remain in the liquid compartment during the operation of the governor. Thus, on rotation of the governor a ring of actuating fluid will be formed therein, the action of centrifugal force acting to return a certain portion of the fluid in the liquid compartment to the fluid supply chamber 32 through the ports 39 of the nozzle element 38. The amount of fluid that is drained from or returned to the fluid supply chamber will depend on the equilibrium which is established between the centrifugal force exerted by the rotating fluid, the static head of the fluid in the fluid supply chamber 32 and the automatic counter force exerted by the spring 30 which is overcome by the centrifugal force. The effect of the centrifugal force acting through the fluid in the compartment 17 against the diaphragm 14 will be to move the diaphragm outwardly. This in turn actuates the control rod 22 and lever 25 to control the mechanism not shown, in turn controlling the speed of the device to be governed and this setting will be the predetermined speed setting for the particular radial position at which the nozzle element 38 has been set.

If it is desired to change the speed setting to a new speed at which it is desired to control the device to be governed, the crank 43 may be once again rotated to position the nozzle element to a new radial position to produce such speed setting and the fluid in the liquid compartment 17 will readjust itself till an equilibrium is reached once again as was above described relative to the initial setting of the nozzle element 38. In accordance with the change in equilibrium, fluid will either be discharged from or drained to the fluid supply chamber 32 causing variations in the pressure of the actuating fluid which either increases or decreases the axial movement of the diaphragm member 14 with a corresponding change in the control rod 22 and lever 25 to modify through suitable well known mechanism the speed of the device to be governed.

Since the crank member 43 is disposed externally of the governor vessel 10, it is believed clear that the nozzle element 38 may be adjusted and the governor set at a new speed without the necessity of stopping the operation of the governor or the device being governed.

The form of the invention shown in Figure 1 will also react substantially instantaneously to variations in the speed of the governor caused by variations in the load on the device being governed. This sharp reaction rate prevents "hunting" by the governor in returning the device being governed to the specific or predetermined speed setting.

In this respect, the present governor operates identically with the fixed speed type hydraulic mechanical governor illustrated and described in the copending application Serial No. 606,713 filed August 28, 1956.

Figure 4:
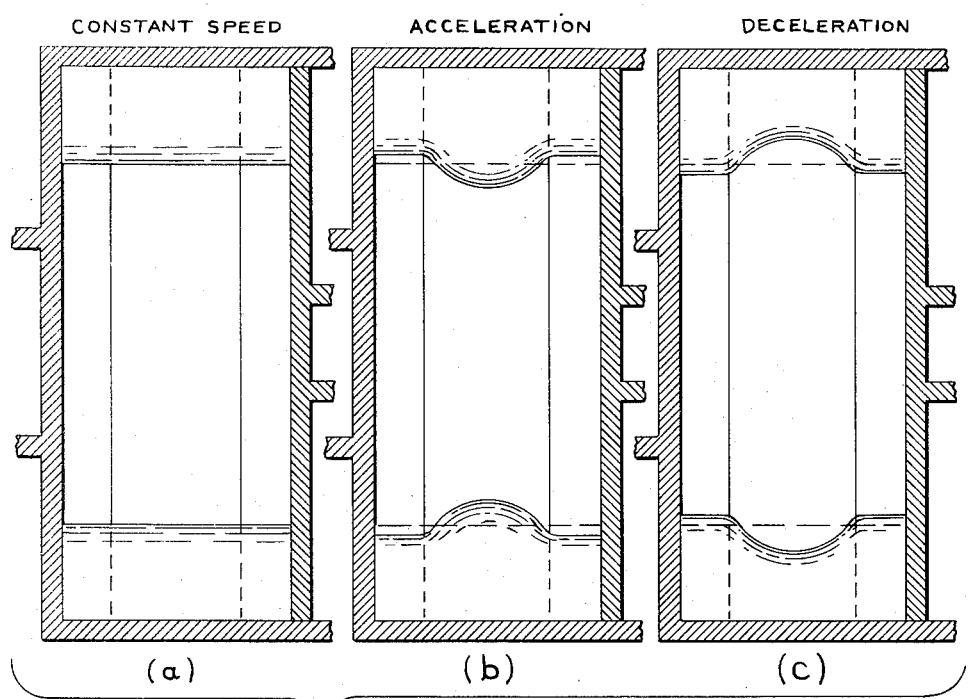
Figure 4 is a diagram illustrating the flow pattern of the liquid across the vane portion of the vessel body in Figure 1 during speed changes of the governor.

Thus, referring to Figure 4, Figure 4a shows the condition of the fluid ring in compartment 17 when the load on the device being governed is substantially constant. Figure 4b shows the dynamic condition as the load varies to cause the shaft and hence the governor speed to accelerate. Under this condition, the portion of the liquid in compartment 17 which is confined between the intermeshing vanes 18 and 19 will be accelerated with the governor while that portion of the fluid in the compartment 17 disposed in the annular portion 26 will lag due to the inertia of the mass of the fluid. The higher pressure or force of the faster rotating mass of fluid disposed between the vanes 18 and 19 will act to force the fluid in the annular portion 26 toward the center of the compartment 17 creating a free surface substantially as shown in Figure 4b. However, since the axial openings 39 of the nozzle 38 communicate with the space adjacent the portion of the compartment occupied by the intermeshing vanes 18 and 19 and the fluid contained therebetween is instantaneously discharged into this space formed between the intermeshing vanes to join the mass of fluid and to rotate therewith thereby increasing the static head or pressure which will in turn move the diaphragm 14 in turn actuating the rod 22 connected thereto and to the mechanism, not shown, controlling the device to be governed to reduce the speed thereof to the predetermined speed setting of the governor.

Conversely, Figure 4c shows the dynamic condition when the load on the device to be governed increases, thereby causing the shaft and, hence, the governor to decelerate. When this occurs the portion of the fluid which is confined between vanes 18 and 19 will in turn be decelerated at the same time while the liquid in the annular portion 26 will continue in motion at the higher speed. The higher force now exerted by the faster moving mass of fluid in the annular portion 26 will cause the fluid rotating in the compartment 17 to assume a free surface similar to that shown in Figure 4c and once again by reason of the position of the axial ports 39 in the nozzle 38 fluid will be caused to drain off from the intermeshing vanes 18 and 19 thereby reducing the static head or pressure in the total mass of fluid in the compartment 17 acting against the diaphragm 14. Spring 30 will now act to move the diaphragm member 14 in a direction opposite and proportional to the force exerted by the fluid in the liquid compartment which in turn causes the diaphragm to actuate the governor rod 22 in a direction towards the shaft end of the vessel 10 to signal the mechanism to increase the speed of the device to the predetermined speed setting of the governor.

The embodiment of the invention shown in Figure 2 also provides a hydraulic mechanical governor which may be varied to an infinite number of speed settings and in which the inner radius of the actuating fluid is maintained constant for any specific setting to prevent "hunting" by the governor through the operation of a continuous flow of actuating fluid into and out of the liquid compartment during operation of the governor.

Figure 2 shows a vessel 50 having a perforated disc 51 formed integrally therewith and disposed in the vessel 50 adjacent one end of the vessel. The perforated disc has a hub 52 along the axial line of the vessel which is keyed as at 53 to the shaft 54 of the device, not shown, to be governed so that the vessel 50 will be rotatable with the shaft 54 during all times that the device is in operation. A piston 55 is slidably mounted in the vessel 50 to provide a liquid compartment generally designated 56 between the perforated disc 51 and the piston member 55.

A slot 57 in the piston 55 and a pin 58 in the member 50 will allow the piston to slide relative to the vessel and to rotate with the vessel. A spring member 59 between the piston and a backup member 60 on the end of the vessel remote from the shaft connected end will normally urge the piston towards the disc member 51 and during operation will at all times act to move the piston in a direction opposite and proportional to the decrease in force exerted by the actuating fluid in the compartment 56 as is hereinafter described.

The backup member 60 is provided with opening 61 to drain any leakage fluid by-passing the piston from the liquid compartment 56.

The piston member 55 is further connected to a non-rotatable hollow control rod 62 by means of a thrust collar 63 provided on said rod which abuts a shoulder 64 formed by the piston on one side thereof and a seal 65 on the other side so that movement of the piston will be transferred to the control rod 62 whereby it can actuate through suitable lever means, not shown, the mechanism also not shown for controlling the speed of the device being governed.

The perforated disc is provided with a plurality of radially extending vane members 66 circumferentially spaced relative to the axial center of the vessel, which vanes project axially into the liquid compartment 56. These vanes intermesh and overlap a plurality of similar radially extending vane members 67 spaced on the face of the piston member 55 delineating the liquid chamber 56 circumferentially relative to the axial center of the vessel and extending axially into the liquid compartment 56.

Actuating fluid is continuously delivered to the liquid compartment 56 through the transverse passages 68 and fluid supply chamber 69 in the piston member 55 and the passage 70 formed in the hollow internal rod 62 which communicates between the fluid supply chamber 69 and a source of fluid under pressure, not shown.

Actuating fluid is continuously discharged from the liquid compartment through the plurality of perforations or openings 71 in the perforated disc 51.

Figure 3:
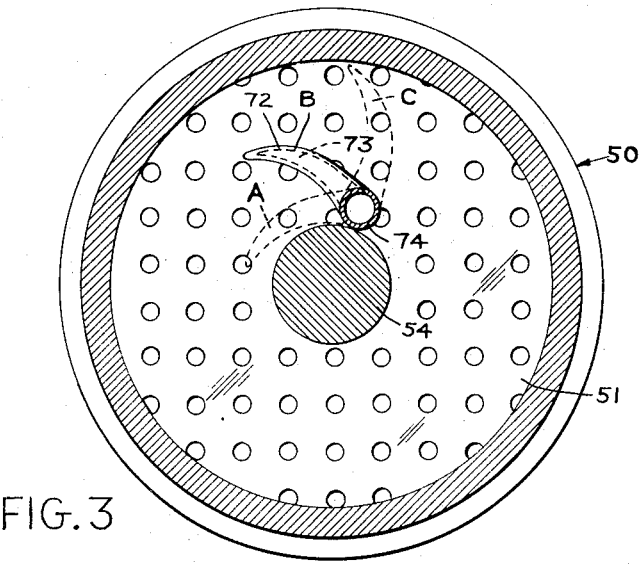
Figure 3 is a section taken on line 3—3 of Figure 2.

A hollow member 72 having an axially disposed nozzle 73 communicating with the perforations or openings 74 connects with a return line 75 which communicates with the source of fluid, not shown. The hollow member 72 is adapted to be moved so the nozzle 73 may be adjusted radially inward and outward relative to the axial center of the vessel 50 as is illustrated by the various positions *a*, *b* and *c*, in Figure 3 of the drawings.

*Operation*

In operation, actuating fluid is passed to the liquid compartment 56 through the passage 70 in the control rod 62, fluid supply chamber 69, and transverse passages 68 above described. As the vessel and piston are rotated by the shaft 54 the intermeshing vanes 66 and 67 will place the actuating fluid in the compartment 56 in motion so that a ring of fluid is formed, the inner radius of which will be controlled by the radial position of the nozzle 73 in the hollow member 72. The liquid in the compartment will flow through the perforation 71 in the disc 51 by differential pressure and will be returned by the hollow member 72 through the return line 75 to the source of pressure.

For each particular position of the nozzle 73 a different governing speed will be obtainable because the nozzle will control the inner radius of the ring of fluid formed in the compartment 56 and hence the volume of liquid that will be acted upon in the compartment.

Where the shaft accelerates or decelerates the piston will be actuated to move the control rod 62 by addition or removal of fluid through equilibrium with the incoming and outgoing fluid in the compartment 56, the axial relationship of the openings of the transverse passages 68 and the axial relation of the nozzle 73 acting in much the same manner as above described with respect to Figure 4 in the form of the invention shown in Figure 1.

It will be understood that changes may be made in the form, location and materials used in the construction of an arrangement of the various parts of the apparatus disclosed herein without departing from the principles of the invention which is not to be limited excepting by the scope of the appended claims.

What is claimed is:

1. A variable governor adapted to control the speed of a rotatable shaft at more than one speed setting comprising, a vessel fixed to and rotatable with said shaft, means slidably disposed in said vessel to form a compartment for receiving actuating fluid, vane means disposed to rotate the fluid in said compartment in accordance with the rotational speed of said shaft whereby said fluid will act to move said means in one direction, tension means to urge the slidable means in a direction opposite and proportional to any reduction in force exerted by the actuating fluid, a non-rotatable governor control rod connected to said slidable means to be moved axially relative to said vessel, a container at one end of said governor rod forming a fluid supply chamber disposed in said compartment, a passage providing communication between said fluid supply chamber and a source of actuating fluid, a nozzle element slidably mounted in said fluid supply chamber and extending radially into said compartment, said nozzle having axially disposed openings to provide means for supplying fluid to said liquid compartment, and means to adjust the relative radial position of said axially disposed openings to regulate the quantity of actuating fluid in said compartment during operation of the governor and to stabilize the action of said actuating fluid.

2. In a variable governor as claimed in claim 1 wherein said adjusting means includes a shaft extending axially through said passage, an eccentric on one end of said shaft pivotally connected to said nozzle, and crank means disposed exteriorly of said governor connected to the other end of said shaft.

3. A variable speed control governor for a rotatable shaft comprising a cylindrical body fixed to said shaft for rotation therewith, a liquid compartment in one end of said body, a diaphragm disposed adjacent said compartment, a bellows connected at one end thereof to said diaphragm and at the other end thereof to the body end wall to permit axial movement of the diaphragm in said body, a liquid container positioned in said compartment, a non-rotating and hollow governor rod connected to said diaphragm for axial movement therewith, said hollow rod in communication with the liquid container for passing liquid therethrough to said container, radial vanes formed on said body adjacent said container therein, other radial vanes on said diaphragm extending into said compartment between said body vanes, said diaphragm vanes having radially extending recesses therein, said body and diaphragm vanes rotating the liquid in said compartment to move the diaphragm and rod axially in one direction when the shaft speed exceeds a predetermined value, tension means for moving the diaphragm and rod axially in the opposite direction when the shaft speed falls below said predetermined value, a nozzle on said container extending into said recesses, said nozzle having an axial opening therein, and nozzle adjusting means for changing the radial displacement of said axial opening from the central axis of said compartment to vary said predetermined shaft speed value.

4. The variable speed control governor of claim 3 wherein said radial vanes are formed on the circumferential portion of said body, said other radial vanes are disposed on the circumferential portion of said diaphragm, and said recesses are disposed adjacent the inner ends of said diaphragm vanes.

References Cited in the file of this patent

FOREIGN PATENTS

| | | |
|---|---|---|
| 350,612 | Germany | Mar. 23, 1922 |
| 372,382 | Germany | Mar. 27, 1923 |
| 146,642 | Great Britain | July 14, 1920 |
| 217,559 | Great Britain | Jan. 15, 1925 |
| 748,113 | Great Britain | Apr. 18, 1956 |